March 17, 1959    H. D. MOORE ET AL    2,877,673
SAFETY DRILL BUSHING
Filed Sept. 19, 1957    2 Sheets-Sheet 1
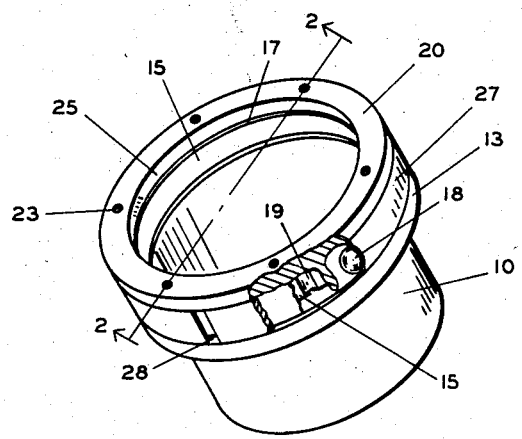
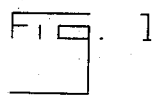
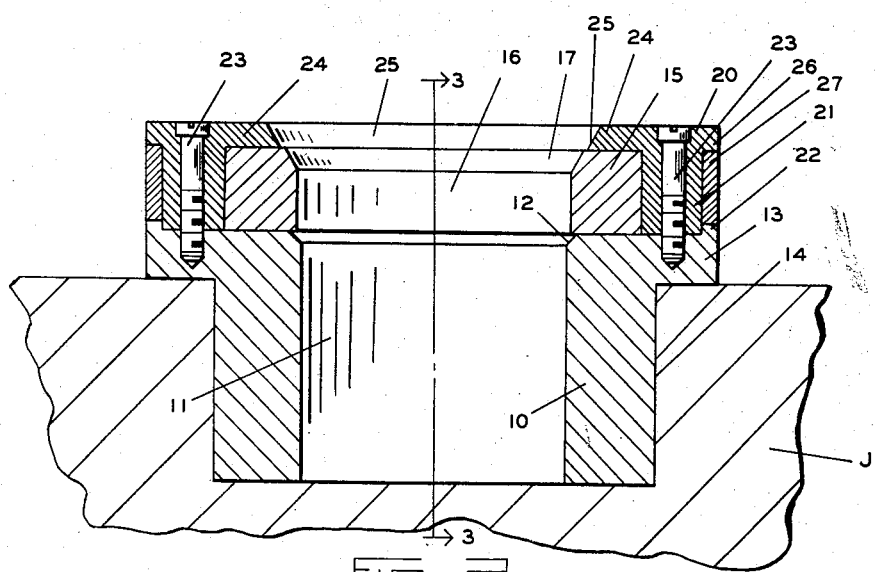
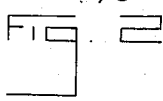
INVENTORS
HARRY D. MOORE
CLARENCE R. JAMES
DONALD R. KIBBEY
BY CORBETT, MAHONEY, MILLER & RAMBO
BY                ATT'YS.

March 17, 1959  H. D. MOORE ET AL  2,877,673
SAFETY DRILL BUSHING

Filed Sept. 19, 1957  2 Sheets-Sheet 2

INVENTORS
HARRY D. MOORE
CLARENCE R. JAMES
DONALD R. KIBBEY
BY
CORBETT, MAHONEY, MILLER & RAMBO
BY W. S. Rambo
ATT'YS.

United States Patent Office 2,877,673
Patented Mar. 17, 1959

2,877,673

SAFETY DRILL BUSHING

Harry D. Moore, Worthington, and Clarence R. James and Donald R. Kibbey, Columbus, Ohio, assignors to The Ohio State University, Columbus, Ohio Application September 19, 1957, Serial No. 684,910

8 Claims. (Cl. 77—62)

This invention relates to a safety drill bushing. It has to do, more particularly, with a drill bushing which is yieldable upon the insertion by mistake of a larger diameter tool, such as a reamer tool, and which will also provide a signal upon such an occurrence.

In drill press operations, it is common practice, first, to subject a workpiece to an initial drilling operation with the conventional vertically or horizontally movable drill bit, and after initially drilling a hole in the workpiece, to then replace the drill bit with a reamer tool to accurately size and finish the opening or hole in the workpiece. In these respective operations, that is, drilling and reaming, it is common to employ two different types of bushing elements which are positioned upon a jig or fixture, located in proper relation to the workpiece and formed with a bearing opening in vertical alignment with the drill and reamer, for the purpose of guiding and rotatably supporting the drill bit or reamer head as the same passes through the workpiece. It oftentimes occurs that the machine tool operator will forget or neglect to remove the drill bushing before using the reamer tool, and due to the different diameters of the drill and reamer bits, and the physical properties of the metals of the respective drill and reamer bushings, this neglect can result in destroying or materially dulling the reamer tool and/or damaging the drill bushing.

In order to eliminate this difficulty, this invention provides a safety drill bushing which is so designed that it will receive a drill bit in the normal way but if a larger reamer bit is inserted therein, it will yield to prevent injury to the reamer bit and/or the drill bushing and at the same time will develop a signal, preferably audible, which will indicate to the operator that the wrong bushing is being used.

In the accompanying drawings, there is illustrated a preferred embodiment of this invention.

In these drawings:

Figure 1 is a perspective view, partly broken away, of a drill bushing embodying this invention.

Figure 2 is a vertical sectional view through the bushing taken along line 2—2 of Figure 1 and showing it mounted on a jig or fixture.

Figure 3:
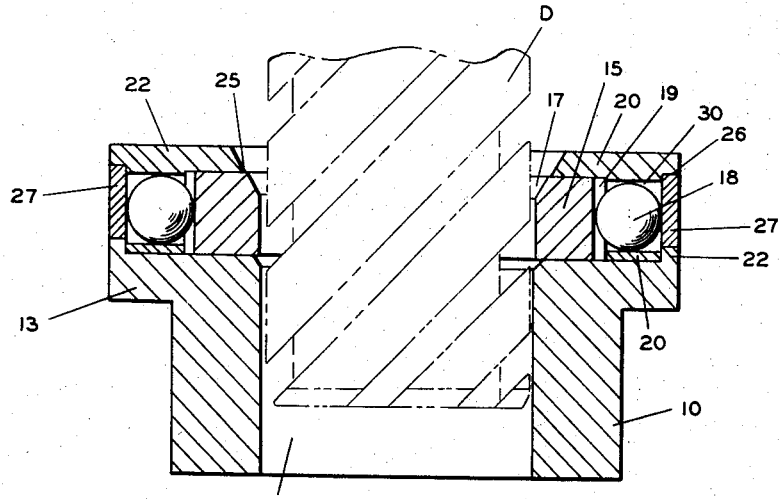
Figure 3 is a schematic view with a vertical section through the bushing taken along line 3—3 of Figure 2 and showing normal use of the bushing as a guide for a drill bit.

With reference to the drawings, in Figure 1 there is illustrated the general structure of a safety drill bushing in which this invention is embodied. As illustrated more in detail in Figure 2, the bushing comprises a sleeve-like body member 10 which has a bore 11 extending therethrough that is adapted to receive and guide the drill bit which is indicated at D in Figure 3. At its upper end, this bore 11 is provided with an outward bevel 12 to facilitate entrance of the drill bit. The upper end of the body 10 is provided with an outwardly directed peripheral supporting flange 13. This body 10 is adapted to be mounted non-rotatably within a receiving socket 14 formed in a drilling jig or fixture J which may be associated with a drill press type machine or other types of machines. The supporting flange 13 will rest on the upper surface of the jig, as indicated in Figure 2, to prevent downward movement of the body relative to the socket 14 during the drilling operation.

Mounted on the upper end of the body 10, is a slip ring or collar 15. This collar 15 is of annular form and is provided with a central opening 16 which is in axial alignment with the bore 11 but is of slightly greater diameter than the bore, as indicated in Figure 2. At its upper corner around the opening 16, the collar 15 is chamfered or beveled, as indicated at 17, to provide an outward flare for aiding in centering the drill bit D relative to the opening 16.

The collar 15 is mounted on the upper end of the body 10 for rotative movement relative thereto but this rotation is normally prevented by means of a series of angularly spaced yieldable detent units. These yieldable detent units include the balls 18. These balls 18 cooperate with vertical ball-receiving sockets or flutes formed at closely spaced intervals around the outer circumference of the collar 15. The sockets or flutes 19 are preferably of segmental cylindrical form and extend vertically the full height of the collar as shown in Figure 1.

For keeping the collar 15 centered and to retain it in position on the upper end of the body 10, a ring 20 of T-cross-section is provided. The body 21 of this ring surrounds the collar 15 and fits within an upstanding annular shoulder 22 formed at the outer edge of the supporting flange 13 of the body 10. Cap screws or bolts 23 are passed downwardly through angularly spaced openings in the ring 20 and are threaded into aligning openings in the flange 13 to retain the ring 20 in position as shown in Figure 2. The ring 20 is provided with an inwardly extending retaining flange 24 which extends over the outer surface of the collar 15 to prevent upward displacement thereof. The inner edge of the flange 24 is also beveled or flared outwardly as indicated at 25. The ring 20 is also provided with an outwardly extending continuous retaining lip 26. Between this lip 26 and the shoulder 22 is a split ring spring 27 which extends around the body 21 of the ring 20 and which normally closely embraces the outer surface of the ring body 21 as indicated in Figure 2. The split in the ring is indicated at 28 in Figure 1.

The balls 18, as previously indicated, cooperate with the flutes 19 and function as detent units. Any suitable number of these balls may be provided but it is preferred that one ball be located midway between each pair of screws 23. Each ball 18 is disposed in a radial bore 30 extending through the body 21 of the ring and open at both ends as shown best in Figure 3. The diameter of each bore is just slightly larger than that of the cooperating ball so that the ball can move radially of the bore. The length of the bore 30 is slightly less than the diameter of the ball 18. Therefore, when the ball is seated in one of the flutes 19, as shown in Figure 3, where it is normally held by the spring 27, the spring is flat against the outer surface of the ring body 21.

Figure 4:
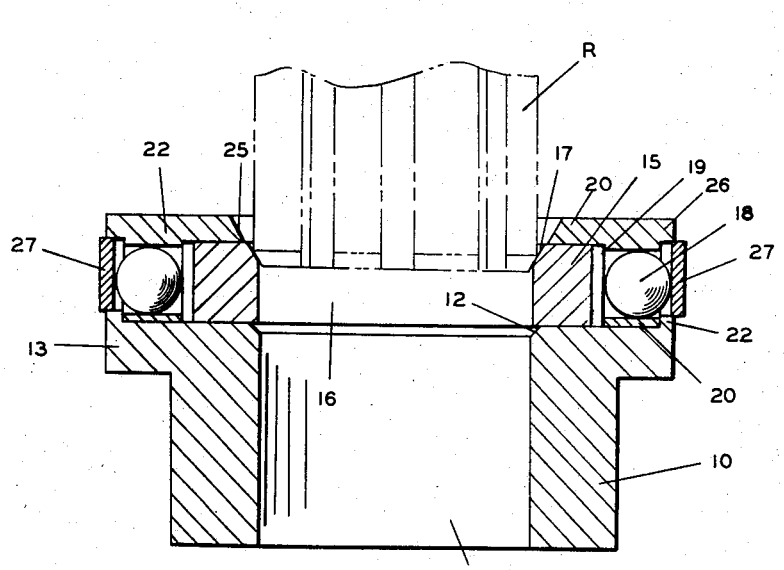
Figure 4 is a similar view showing the action of the bushing if it is attempted to pass a reamer bit thereinto.

With this structure, as indicated in Figure 3, a drill bit D may be easily positioned in the bore 11 of the body 10. The flared openings in the ring 20 and collar 15 will center and guide the bit into the bore 11 of the bushing as it is inserted therein. Since the bore 16 of the collar 15 will be slightly larger than the bore 11, which receives the drill bit D, the leading end of the bit will easily pass into the bore 11 of the drill bushing body 10. Normally, during drilling, the balls 18 will be held in position in the associated flutes, sockets or notches 19 by the spring 27 and the collar 15 will not rotate relative to the body 10 because of the detent units. However, if the drill D is withdrawn and the operator inadvertently attempts to insert a reaming tool R, as indicated in Figure 4, the balls 18 will be moved in and out of the successive sockets or flutes 19 and an audible signal will be given. This will be evident from Figure 4 where it will be noted that if it is attempted to insert the reaming tool R, which is always of slightly greater diameter than the drilling bit D, the tool will be centered relative to the collar 15 by the flared surfaces 25 and 17, but will not pass through the opening 16 in the collar. Therefore, contact of the end of the reamer R with the collar 15 will rotate the collar relative to the body 10, since the balls 18 will roll out of the sockets or flutes 19 and outwardly of the bores 30 due to the fact that the spring 27 will yield outwardly. This rolling of the balls 18 in and out of the successive flutes 19, permitted by radial movement of the balls, will produce a chattering noise which will be readily audible to the operator and will indicate to him that he is attempting to insert the wrong tool in the drill bushing.

It will be apparent from the above that this invention provides a safety drill bushing which is so designed that it will receive a drill bit in the normal way but if it is attempted to insert the larger reaming tool, the detent units between the collar and the drill bushing body will yield to permit rotation of the collar relative to the body and will provide an audible signal.

Various other advantages will be apparent.

Having thus described this invention, what is claimed is:

1. A safety drill bushing comprising a sleeve-like body member having an axial bore therein for receiving a drill bit, a collar member mounted on the upper end thereof having an opening in axial alignment with the bore and being of such size that the drill bit can freely pass therethrough, means for rotatably mounting said collar on said body comprising yieldable detent units between the collar and the body, said detent units yielding to permit rotation of the collar relative to the body when a tool of larger diameter than the drill bit engages said collar and producing an audible signal.

2. A safety drill bushing according to claim 1 in which the said opening in the collar at its outer end is flared to guide the bit or other tool thereinto.

3. A safety drill bushing comprising a sleeve-like body member having an axial bore therein for receiving a drill bit, a collar member mounted on the upper end thereof having an opening in axial alignment with the bore and being of such size that the drill bit can freely pass therethrough, means for rotatably mounting said collar on said body comprising yieldable detent units between the collar and the body, said detent units yielding to permit rotation of the collar relative to the body when a tool of larger diameter than the drill bit engages said collar and producing an audible signal, said detent units between said body member and said collar member consisting of sockets in one of said members, balls cooperating with said sockets, and resilient means on the other member for normally keeping the balls in said sockets.

4. A safety drill bushing according to claim 3 in which the sockets are formed in said collar at closely spaced intervals around its circumference and the balls are carried by said body at angularly fixed positions in engagement with said circumference.

5. A safety drill bushing according to claim 4 in which said sockets are in the form of flutes of segmental cylindrical form and extend in the direction of the axis of the sleeve-like body completely through the collar, said balls being located in pockets extending radially of the body for limited radial movement, said pockets having their inner ends open so that the balls can enter said flutes, said resilient means comprising a spring associated with the outer ends of said pockets to normally keep the balls in associated flutes.

6. A safety drill bushing comprising a sleeve-like body member having an axial bore therein for receiving a drill bit, a collar member mounted on the upper end thereof having an opening in axial alignment with the bore and being of such size that the drill bit can freely pass therethrough, means for rotatably mounting said collar on said body and including a retaining ring carried by the body and surrounding said collar, yieldable detent units between the ring and the collar, said detent units including vertically disposed flutes formed on the outer surface of said collar at angularly spaced frequent intervals and radial bores extending through said ring at angularly spaced intervals, balls in said bores for movement radially therein and being of a diameter greater than the length of the bores, and a split-ring spring surrounding said ring and engaging said balls to normally force them inwardly of said bores but yielding outwardly when the collar is rotated to permit sufficient radial movement of the balls to permit them to roll in and out of said flutes.

7. A safety drill bushing comprising a body member having a collar member mounted thereon for relative rotation, said collar being provided with an axial opening which will permit the passage of a drill tool for which the bushing is designed but will prevent the passage of a tool of larger diameter, and yieldable detent means between the collar and the body which normally prevents rotation of the collar relative to the body when said drill tool is inserted in said collar but which yields to permit such relative rotation when a larger diameter tool engages said collar.

8. A safety drill bushing according to claim 7 in which said detent means comprises balls carried by one of said members and a cooperating notched surface on the other of said members, and spring means for urging the balls towards said notched surface.

References Cited in the file of this patent

UNITED STATES PATENTS

| | | |
|---|---|---|
| 2,283,338 | Pegard | May 19, 1942 |
| 2,353,295 | Day | July 11, 1944 |
| 2,507,204 | Giern et al. | May 9, 1950 |